United States Patent
McGee et al.

(10) Patent No.: US 7,051,117 B2
(45) Date of Patent: May 23, 2006

(54) SMART BOOKMARKS

(75) Inventors: Jason R. McGee, Apex, NC (US); Christopher C. Mitchell, Raleigh, NC (US); Michael John Morton, Cary, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/202,791

(22) Filed: Jul. 25, 2002

(65) Prior Publication Data

US 2004/0019632 A1    Jan. 29, 2004

(51) Int. Cl.
*G06F 15/16* (2006.01)

(52) U.S. Cl. .................. 709/245; 709/203; 709/217; 709/218; 709/219; 715/530

(58) Field of Classification Search .............. 709/245, 709/203, 217, 218, 219; 715/530
See application file for complete search history.

(56) References Cited

U.S. PATENT DOCUMENTS

| | | | | |
|---|---|---|---|---|
| 5,592,538 A | 1/1997 | Kosowsky et al. | ........... | 379/93 |
| 5,625,781 A | 4/1997 | Cline et al. | ............. | 395/335 |
| 5,715,450 A | 2/1998 | Ambrose et al. | .......... | 395/614 |
| 5,905,988 A | 5/1999 | Schwartz et al. | .......... | 707/104 |
| 5,917,491 A | 6/1999 | Bauersfeld | ............ | 345/352 |
| 6,041,360 A * | 3/2000 | Himmel et al. | ............ | 709/245 |
| 6,072,490 A | 6/2000 | Bates et al. | ............. | 346/347 |
| 6,189,024 B1 | 2/2001 | Bauersfeld et al. | ......... | 709/203 |
| 6,195,679 B1 | 2/2001 | Bauersfeld et al. | ......... | 709/203 |
| 6,212,522 B1 | 4/2001 | Himmel et al. | ............. | 707/10 |
| 6,219,679 B1 | 4/2001 | Brisebois et al. | ........... | 707/501 |
| 6,223,178 B1 | 4/2001 | Himmel et al. | ............. | 707/10 |
| 6,247,021 B1 | 6/2001 | Himmel et al. | ............ | 707/104 |
| 6,256,639 B1 | 7/2001 | Himmel et al. | ............ | 707/104 |
| 6,314,423 B1 | 11/2001 | Himmel et al. | ............. | 707/10 |
| 6,321,222 B1 | 11/2001 | Söderström et al. | .......... | 707/5 |
| 6,324,566 B1 | 11/2001 | Himmel et al. | ............ | 709/203 |
| 6,549,941 B1 * | 4/2003 | Jaquith et al. | ............ | 709/219 |
| 6,701,352 B1 * | 3/2004 | Gardner et al. | ............ | 709/218 |
| 6,895,554 B1 * | 5/2005 | Endress et al. | ............ | 715/530 |
| 2001/0029510 A1 | 10/2001 | Tokui | ........................ | 707/200 |
| 2001/0034658 A1 | 10/2001 | Silva et al. | ................... | 705/26 |

OTHER PUBLICATIONS

*Automated Buddies Could Change Instant Messaging, St. Petersbur Times*, (Jun. 11, 2001), [viewed Jun. 12, 2002 @ <http://www.sptimes.com/News/061101/news_pf/Techguide/Automated_buddies_cou.shtml>].

\* cited by examiner

*Primary Examiner*—Ario Etienne
*Assistant Examiner*—Yves Dalencourt
(74) *Attorney, Agent, or Firm*—A. Bruce Clay; Christopher & Weisberg, PA

(57) ABSTRACT

A smart bookmark article of manufacture can include both a network address pointing to the network location of content specifying a form; and, one or more field references, each field reference corresponding to fields specified in the form. The smart bookmark article of manufacture also can include at least one field attribute corresponding to at least one of the field references.

9 Claims, 4 Drawing Sheets

SMART BOOKMARKS

BACKGROUND OF THE INVENTION

1. Statement of the Technical Field

The present invention relates to the field of content browsing and more particularly to content browser bookmark based form processing.

2. Description of the Related Art

The popularization of the World Wide Web has facilitated the distribution of vast quantities of network content across a wide range of top interests. Whereas merely one decade ago network distributable content could be characterized, catalogued and accessed with some ease through such venerable content distribution systems like Archie and Veronica, today, the sheer volume of content available for review over the Internet far exceeds the capabilities of any one content management technology.

Recognizing the inherent challenges of identifying, locating and retrieving specific content of interest from among the vast content offerings of the Internet, information technology firms developed content searching engines able to identify and index content distributed about the Internet. These content searching engines further provide a computer-human interface through which end-users can keyword search or browse content listings for content which has been indexed by the content searching engine. Once the end-user has located a reference to content of interest, the content searching engine can provide direct access via hyperlink technology to the content of interest.

Still, in many cases, end-users identify, locate and visit network sites containing content of interest, yet later the end-users cannot recall the precise network location of the content of interest. In consequence, end-users can be compelled to continually rely upon content searching engines to locate content of interest, even when the end user already had located the content of interest previously. Though the use of content searching engines can be an effective strategy for locating content, the repetitive use of content searching engines can be a tedious and inefficient method of locating previously located content.

Fortunately, content browsing technologies often include a simple indexing technology for memorizing the network addresses of content distributing locations of interest to end users. Referred to in the art as "bookmarks", this simple indexing technology, on command, can store the network address associated with content actively viewed through the content browser. Subsequently, the end-user can access a list of indexed and stored bookmarks to retrieve previously viewed content from a network address associated with the stored bookmark.

While bookmarking can be an effective tool for retrieving static content, certain common dynamic aspects of distributable content are not processable through bookmarking alone. Specifically, forms-based processing in network distributable content requires extensive end user interaction in order to complete and submit forms-based content. Thus, for an end-user to capitalize upon the convenience of bookmarking technology when submitting a form, network inefficiencies can arise.

Specifically, first the end-user must retrieve the content containing the blank form. After a first network exchange in which the request for the blank form can be submitted through the activation of a previously stored bookmark, a second network exchange will be required once the form has been completed so that a back end forms processor can process the completed form. Of course, one can store a network address combined with specific forms input in order to reduce the required network exchange to a single volley. Yet, to do so would limit the effectiveness of this hybrid bookmark to a single, specific user. Hence, what is needed is an intelligent bookmarking system in which forms based processing need not require multiple network exchanges.

SUMMARY OF THE INVENTION

The present invention is a smart bookmarking system, method, apparatus and article of manufacture. A smart bookmark article of manufacture can include both a network address pointing to the network location of content specifying a form; and, one or more field references, each field reference corresponding to fields specified in the form. The smart bookmark article of manufacture also can include at least one field attribute corresponding to at least one of the field references.

A smart bookmarking method can include the following steps. First, responsive to the activation of a smart bookmark reference in a content browser, both a network address of a form specified by network distributable content which had been previously viewed in the content browser, and also a list of form fields disposed in the form can be retrieved from a bookmark data structure. A user interface can be constructed with surrogate fields corresponding to the form fields in the list. User-specified data can be accepted through the surrogate fields. Name-value pairs can be formed with the user-specified data and the form fields. The network address and the name-value pairs can be combined into a network request. Finally, the network request can be forwarded to a content server at the network address. In consequence, the content server can process the network request as if the user-specified data had been accepted through the form rather than through the user-interface.

Importantly, responsive to the activation of an add bookmark command in the content browser, both the network address of a form specified in content displayed in the content browser, and also a list of form fields disposed in the form can be identified. The network address and the list of form fields can be stored in a smart bookmark. Additionally, the smart bookmark can be indexed in a list of bookmarks which can be accessed and selectively activated through the content browser. Notably, at least one field attribute for at least one form field in the list can be identified and stored in the smart bookmark. Moreover, the constructing step can include both constructing a user interface with surrogate fields corresponding to the form fields in the list; and also formatting at least one surrogate field according to a field attribute associated with a corresponding form field.

A smart bookmarking content browser can include a content browser with bookmark logic configured to store network addresses of content which has been viewed through the content browser. Smart bookmark storage further can be provided which can be configured to store smart bookmarks. Each smart bookmark can include a network address pointing to the network location of content specifying a form, and one or more field references. Each field reference can correspond to fields specified in the form. Finally, a surrogate form user interface generator can be configured to generate a user interface with surrogate fields based upon the field references corresponding to the fields specified in the form. The surrogate form user interface can be further configured for formulating a network request based upon the network address and name-value pairs for data specified through surrogate fields in the user interface.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a smart bookmark. In accordance with the present invention, while accessing forms-based content through a content browser, both the network address and the form fields of the forms-based content can be stored and indexed as a bookmark. Upon activation of the bookmark, but prior to engaging in a communicative exchange with a server at the network address, a user interface can be presented to the end user with suitable user interface fields corresponding to the stored form fields. Once the end user has completed the user interface fields, a network request can be forwarded to the server at the network address with suitable name-value pairs associated with the completed user interface fields as if the end user had completed the forms-based content directly. Hence, only a single communicative transaction need occur in the completion of the forms-based content.

Figure 1:
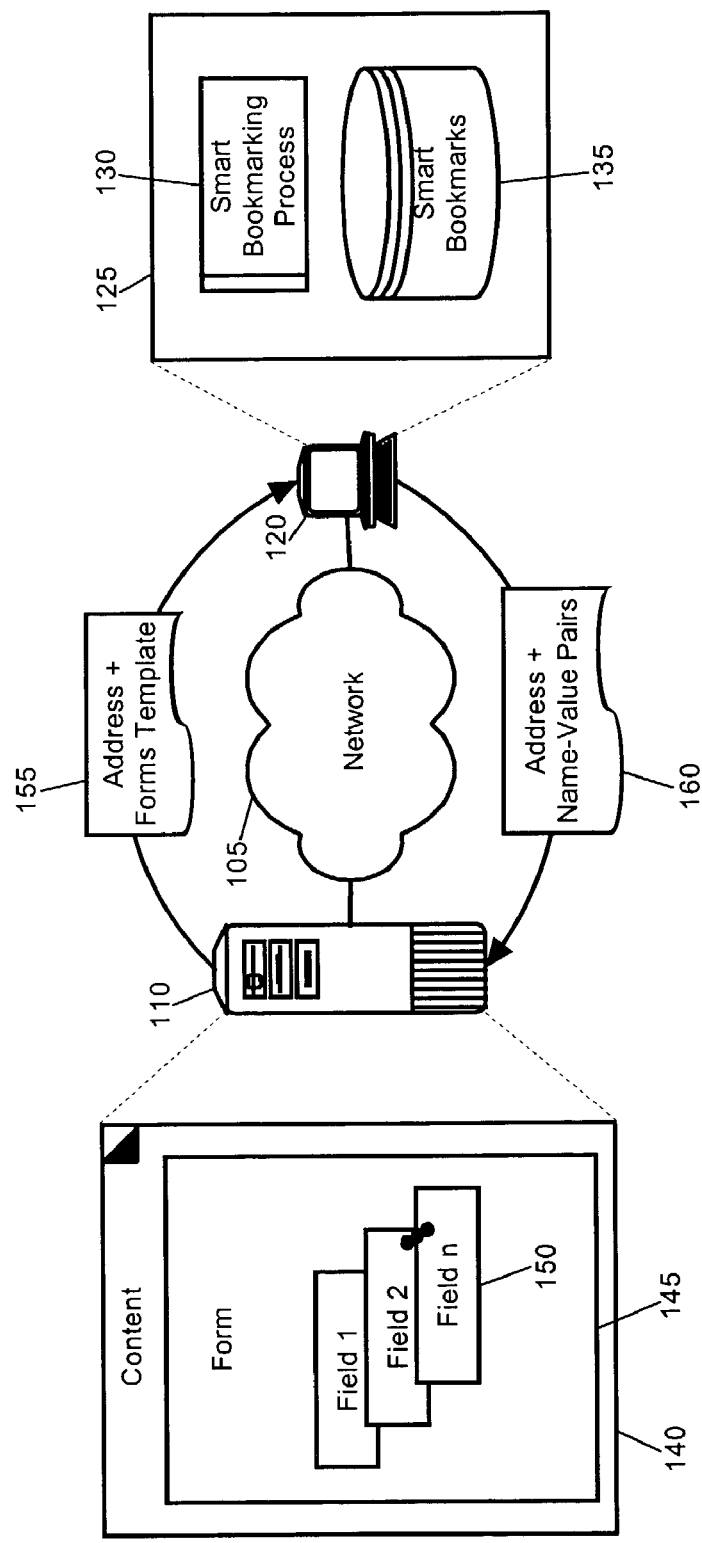
FIG. 1 is a schematic illustration of a smart bookmarking system.

FIG. 1 is a schematic illustration of a smart bookmarking system. As shown in FIG. 1, a client computing device 120 such as a personal computer, handheld or other such pervasive device, can request and receive in a response transmission 155 content 140 from content server 110 over the computer communications network 105. The content 140 can be any type of network distributable content such as a markup language document. The content 140 can define a form 145. Forms are well known in the art of content distribution and can be defined through conventional markup language techniques. The form 145 can include one or more form fields 150, for example static text fields, edit boxes, radio button fields, drop down boxes, spinner buttons and the like.

Once the client computing device 120 has received the requested content 140, a content browser 125 can render the content 140 including the form according to well-known content rendering principles. As in the case of conventional content browsers, circumstances can arise where it would be preferable to "memorize" the network location of the content 140 so as to be able to quickly retrieve the content 140 at a future time. Whereas in conventional content browsers, however, merely a network address can be stored as a bookmark, in the present invention, the content browser 125 can be configured with a smart bookmarking process 130.

Specifically, so as to avoid excess network request-response exchanges ordinarily associated with the retrieval of a form in network distributable content, in the smart bookmarking process of the present invention, not only can the network address of the form 145 in the content 140 be stored in a smart bookmark table 135, but also references to the fields 150 of the form 145 in the content 140 can be stored. In consequence, upon subsequent activation of the stored smart bookmark from the smart bookmark table 135, prior to retrieving the form 145 from the content server 110 a dialog box can be presented with surrogate user interface elements corresponding to the stored fields 150.

Once the surrogate user fields in the client computing device 120 have been completed with user-supplied data, name-value pairs for the fields 150 and the user-supplied data can be assembled into a single network request 160. Once assembled, the network request 160 can be forwarded to the content server 110 as if the form 145 had been completed within the content 140. In this way, the initial network request-response exchange required to retrieve the form 145 can be bypassed resulting in enhanced communications efficiencies and cost savings.

Figure 2A:
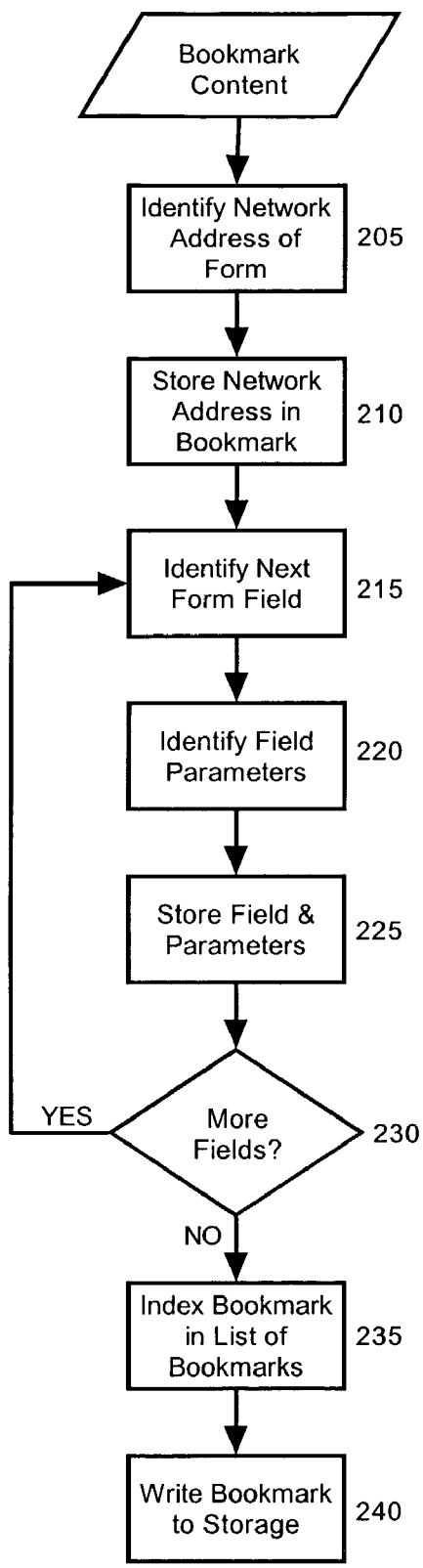
FIG. 2A is a flow chart illustrating a method for storing a smart bookmark.

In order to be able to sufficiently generate a client-side user interface with appropriate fields otherwise required by the form 140, the smart bookmarking process 130 can be configured with a process for storing not only the network address of the form 145, but also field information required to generate a user interface with surrogate fields. In that regard, FIG. 2A is a flow chart illustrating a method for storing a smart bookmark. The process can begin upon the activation of a command to bookmark particular content containing a form such as that displayed in a conventional content browser.

In block 205, the network address of the content and the form can be identified through the content browser application programming interface (API). Subsequently, in block 210 the network address can be stored in a bookmark data structure. In blocks 215 through 230, each of the fields in the form can be identified along with pertinent characteristics and also can be stored in the bookmark data structure. Specifically, in block 215 the first field in the form can be identified along with any associated parameters in block 220, such as permissible values, colors, and the like. In block 225, for each field in the form, the field identity and parameters can be stored in the bookmark data structure. In block 230, the process can repeat until all fields in the form have been processed.

Figure 2B:
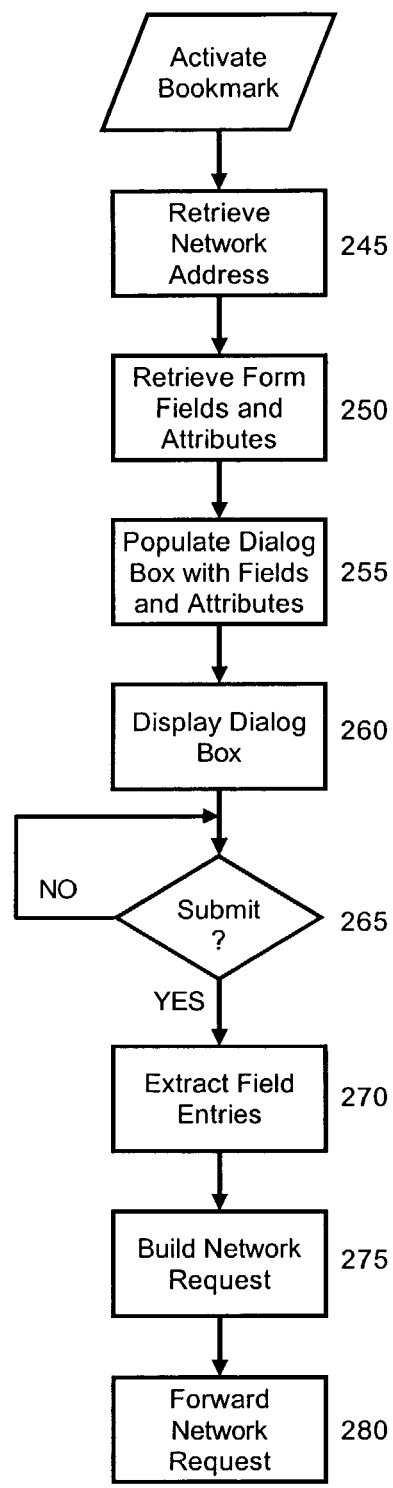
FIG. 2B is a flow chart illustrating a method for processing a stored smart bookmark; and, FIGS. 3A and 3B, taken together, are exemplary screen shots illustrating a process for performing forms-based processing through the use of the smart bookmark of the present invention.

In block 235, optionally, the new smart bookmark entry can be indexed among existing bookmarks, for instance alphabetically, topically, or by folder tree structure. Subsequently, in block 240 the bookmark structure can be written to fixed storage and made accessible through the user interface of the content browser. FIG. 2B is a flow chart illustrating a method for processing a stored smart bookmark in response to its activation through the user interface of the content browser.

Beginning in block 245, the network address for the activated smart bookmark can be retrieved from the bookmark data structure, as can the form fields and attributes in block 250. In block 255, a surrogate user interface for the form, such as a dialog box, computing window, or other such presentation component, can be created and populated with surrogate fields corresponding to the form fields stored in the bookmark data structure. For instance, where a markup language edit box had been referenced in the smart bookmark, a corresponding user interface widget pre-configured to be associated with the markup language edit box can be positioned in the dialog box. Importantly, where field attributes have been specified for a particular form field, the attributes can be applied to the dialog box, for instance a label, a field color, or a required value.

In block 260, once the dialog box has been created, the dialog box can be displayed and the end-user will be free to interact with the dialog box in much the same manner as the end-user could have interacted directly with the form in the network distributable content. In block 265, the end-user can continue to interact with the dialog box by providing data to the surrogate form until the end-user acquiesces through the activation of an OK button, a submit button, or other such similarly functional structure.

Once the end-user has completed the surrogate form, in block 270 the user-supplied form data can be extracted from the dialog box. Subsequently, in block 275 a network request, for instance a POST type request, can be generated by combining the network address for the form in the content, with name-value pairs for the end-user supplied form data and the corresponding form fields. In block 280, the request can be forwarded to the content server as if the end-user had completed the form through the content served by the content server.

Figures 3A, 3B:
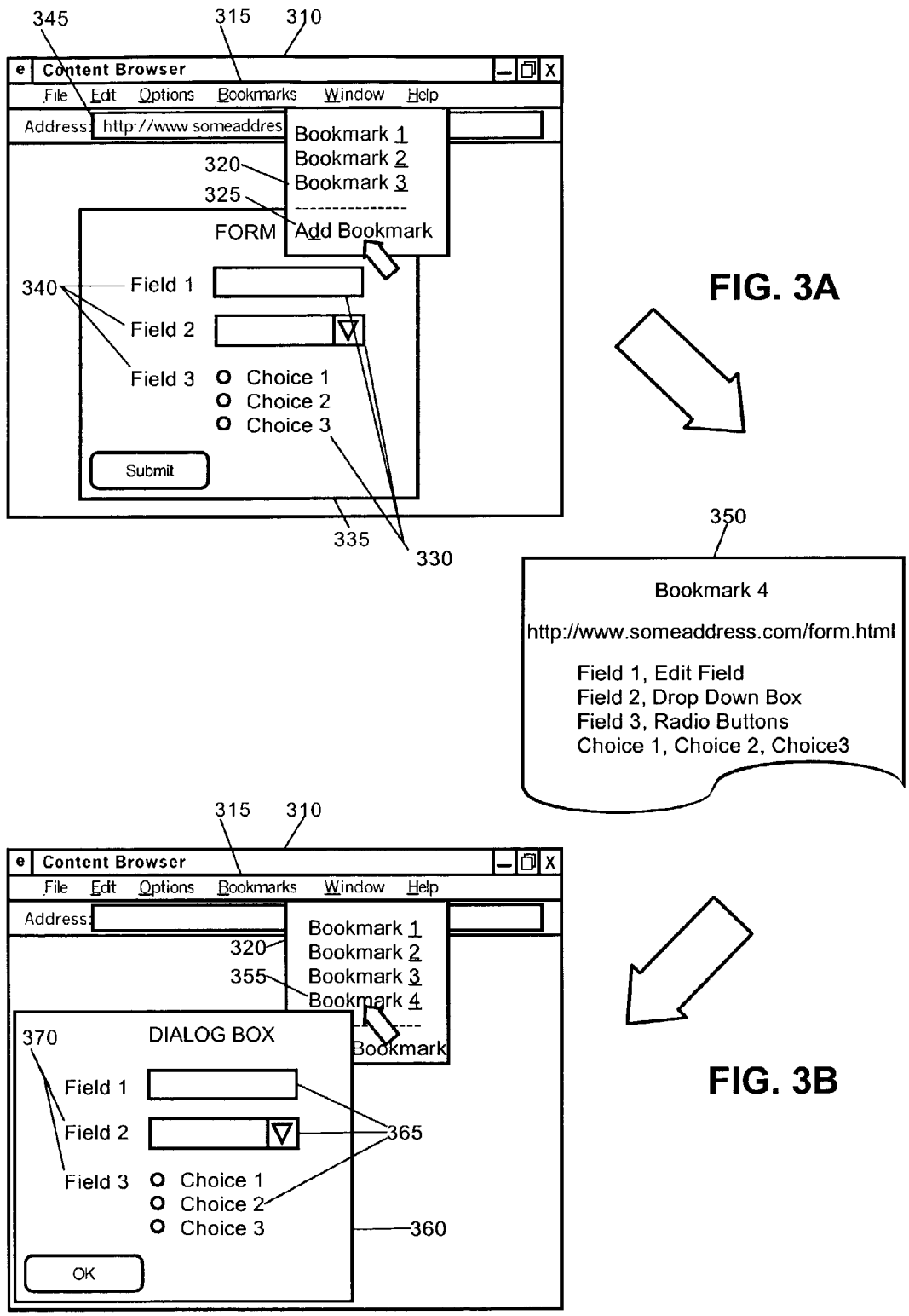

FIGS. 3A and 3B, taken together, are exemplary screen shots illustrating a process for performing forms-based processing through the use of the smart bookmark of the present invention. Referring first to FIG. 3A, a form 335 can be displayed through a content browser 310 having the address 345. The form can include, for example, one or more fields 330 having one or more field attributes 340. The form 335 can be smart bookmarked through the activation of the Bookmarks menu list 320 in the menu bar 315, and subsequently through the activation of the Add Bookmark command 325.

Upon activating the Add Bookmark command 325, a bookmark data structure 350 can be created, stored and indexed in a table of bookmarks. More particularly, the bookmark data structure 350 can include at least a reference to the network address 345 of the form 335, and a listing of the fields 330 in the form 335, and optionally any field attributes 340. Subsequently, referring now to FIG. 3B, the smart bookmark can be activated through the selection of a reference 355 to the smart bookmark in the Bookmarks menu list 320. Unlike conventional bookmarks, however, upon activating a smart bookmark, a user interface 360, such as a dialog box, can be created and displayed with surrogate fields 365 corresponding to the fields 330 of the form. Additionally, optional attributes 370 can be applied to the user interface 360.

The end-user can complete the surrogate fields 365 as if the end-user had been directly interacting with the form 335. Of course, as one skilled in the art will recognized, the end-user can complete the surrogate fields 365 of the user interface 360 without requiring a communicative exchange with the content server from whence the form 335 can be served. In any case, upon completing the surrogate fields 365 of the user interface 360, the values provided by the end-user can be combined with field references to produce name-value pairs. The name-value pairs, in turn, can be combined with the stored network address 345 to form the basis of a request which can be forwarded to the content server. The content server, upon receiving the request, can proceed accordingly, as if the end-user had completed the fields 330 of the form directly.

The present invention can be realized in hardware, software, or a combination of hardware and software. An implementation of the smart bookmarking system and process of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A smart bookmarking method, comprising the steps of:
responsive to the activation of a smart bookmark reference in a content browser, retrieving from a bookmark data structure both a network address of a form specified by network distributable content which had been previously viewed in said content browser, and also a list of form fields disposed in said form;
constructing a user interface with surrogate fields corresponding to said form fields in said list;
accepting user-specified data through said surrogate fields;
forming name-value pairs with said user-specified data and said form fields;
combining said network address and said name-value pairs into a network request; and,
forwarding said network request to a content server at said network address,
whereby said content server can process said network request as if said user-specified data had been accepted through said form rather than through said user-interface.

2. The method of claim 1, further comprising the steps of:
responsive to the activation of an add bookmark command in said content browser, identifying both the network address of a form specified in content displayed in said content browser, and also a list of form fields disposed in said form;
storing said network address and said list of form fields in a smart bookmark; and,
indexing said smart bookmark in a list of bookmarks which can be accessed and selectively activated through said content browser.

3. The method of claim 2, further comprising the steps of:
identifying at least one field attribute for at least one form field in said list; and,
storing said identified at least one field attribute in said smart bookmark.

4. The method of claim 3, wherein said constructing step comprises the steps of:
constructing a user interface with surrogate fields corresponding to said form fields in said list; and, formatting at least one surrogate field according to a field attribute associated with a corresponding form field.

5. A machine readable storage having stored thereon a computer program for smart bookmarking, said computer program comprising a routine set of instructions for causing the machine to perform the steps of:

responsive to the activation of a smart bookmark reference in a content browser, retrieving from a bookmark data structure both a network address of a form specified by network distributable content which had been previously viewed in said content browser, and also a list of form fields disposed in said form;

constructing a user interface with surrogate fields corresponding to said form fields in said list;

accepting user-specified data through said surrogate fields;

forming name-value pairs with said user-specified data and said form fields;

combining said network address and said name-value pairs into a network request; and, forwarding said network request to a content server at said network address, whereby said content server can process said network request as if said user-specified data had been accepted through said form rather than through said user-interface.

6. The machine readable storage of claim 5, further comprising the steps of:

responsive to the activation of an add bookmark command in said content browser, identifying both the network address of a form specified in content displayed in said content browser, and also a list of form fields disposed in said form;

storing said network address and said list of form fields in a smart bookmark; and, indexing said smart bookmark in a list of bookmarks which can be accessed and selectively activated through said content browser.

7. The machine readable storage of claim 6, further comprising the steps of:

identifying at least one field attribute for at least one form field in said list; and, storing said identified at least one field attribute in said smart bookmark.

8. The machine readable storage of claim 7, wherein said constructing step comprises the steps of:

constructing a user interface with surrogate fields corresponding to said form fields in said list; and, formatting at least one surrogate field according to a field attribute associated with a corresponding form field.

9. A smart bookmarking content browser comprising:

a content browser;

bookmark logic configured to store network addresses of content which has been viewed through said content browser;

smart bookmark storage configured to store a plurality of smart bookmarks, each said smart bookmark comprising a network address pointing to the network location of content specifying a form, and a plurality of field references, each said field reference corresponding to fields specified in said form; and, a surrogate form user interface generator configured to generate a user interface with surrogate fields based upon said field references corresponding to said fields specified in said form, said surrogate form user interface having a further configuration for formulating a network request based upon said network address and name-value pairs for data specified through surrogate fields in said user interface.

* * * * *